D. C. NORTON.
HORSE COLLAR.
APPLICATION FILED SEPT. 3, 1915.

1,184,562.

Patented May 23, 1916.

Witnesses
Frederick L. Fox.
J. V. Garner

Inventor
Don C. Norton
By Victor J. Evans.
Attorney

UNITED STATES PATENT OFFICE.

DON C. NORTON, OF ROMEO, MICHIGAN.

HORSE-COLLAR.

1,184,562.            Specification of Letters Patent.      Patented May 23, 1916.

Application filed September 3, 1915. Serial No. 48,840.

*To all whom it may concern:*

Be it known that I, DON C. NORTON, a citizen of the United States, residing at Romeo, in the county of Macomb and State of Michigan, have invented new and useful Improvements in Horse-Collars, of which the following is a specification.

This invention relates to improvements in horse collars, the object of the invention being to provide an improved horse collar with concave indentations in its sides so located as to receive the shoulder points of the horse and thereby enable the collar to fit snugly on the horse's shoulders and around his neck without liability of galling the shoulders at any point and making the same sore.

The invention consists in a horse collar provided in its sides with concave indentations appropriately located and sufficiently deep to receive the points of the shoulders as hereinafter described and claimed.

Figure 1:
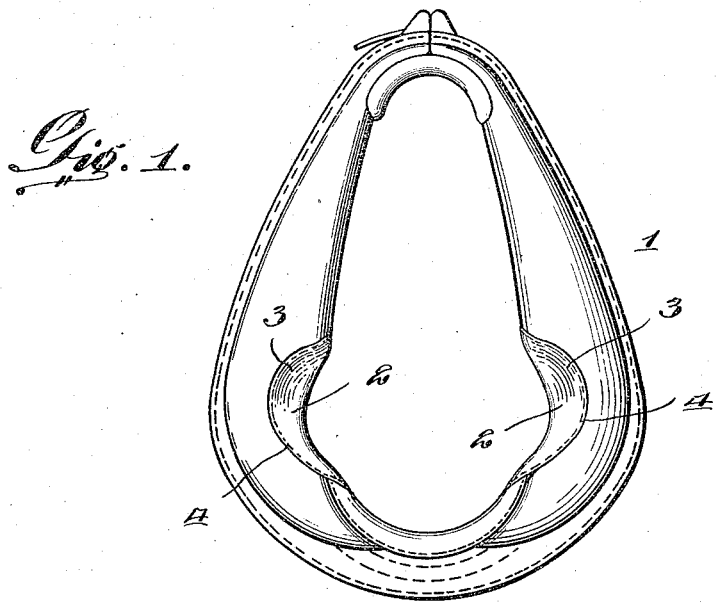
Figure 2:
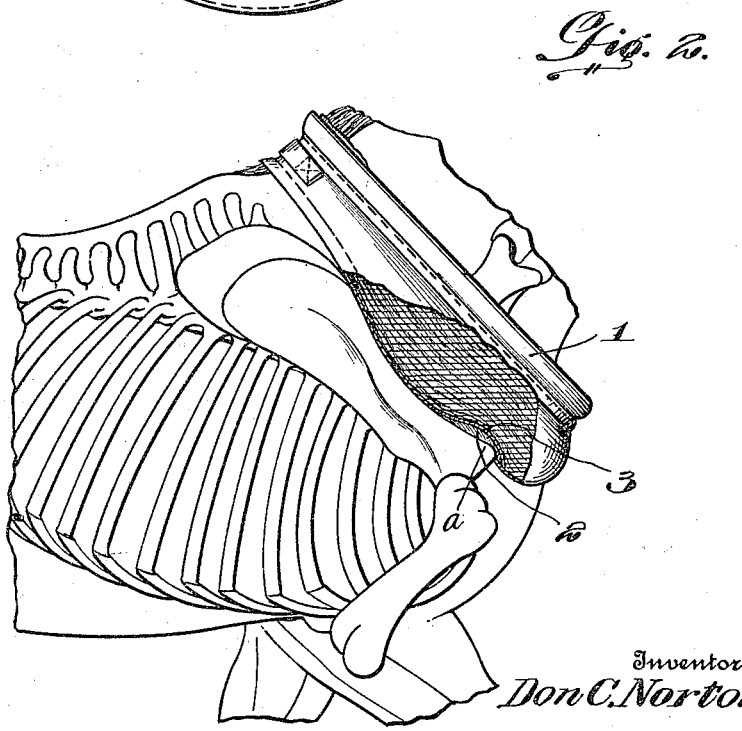

In the accompanying drawings:—Figure 1 is a rear elevation of a collar constructed and provided with shoulder point receiving indentations in accordance with my invention. Fig. 2 is a sectional view of the same and in which the outline of a horse's shoulder and neck and contiguous parts of the skeleton are diagrammatically indicated.

The horse collar 1 may be of the usual general construction. In embodying my invention the collar is formed in its opposing sides with concave indentations 2 which are so located as to coincide with the shoulder points *a* of the horse which wears the collar and in practice are about an inch in diameter and are of sufficient size to receive the shoulder points and thus enable the collar to bear snugly against the horse's shoulders at all portions thereof excepting at the shoulder points and to relieve the shoulder points of stress.

By the provision of the indentations 2 thus located and arranged, the collar is prevented from galling the horse's shoulders, the shoulder points of the horses being the only portions of the shoulder which are liable to be galled and rendered sore by the use of an ill fitting collar.

The indentions 2 are formed by cutting away the corresponding portions of the collar and in accordance with my invention these concave indentations are faced with leather as at 3, the leather facings being stitched around the concave indentations as at 4.

Having thus described my invention, I claim:—

A horse collar having concave indentations in its sides arranged to coincide with the shoulder points of the horse and sufficiently large and deep to receive the shoulder points and hence cause the collar to fit snugly on the shoulders and relieve the shoulder points of stress, the collar being also provided with leather facings in said indentations securely stitched in place.

In testimony whereof I affix my signature in presence of two witnesses.

DON C. NORTON.

Witnesses:
    C. L. LOCKWOOD,
    O. T. STONE.

Copies of this patent may be obtained for five cents each, by addressing the "Commissioner of Patents, Washington, D. C."